W. H. THOMAS.
AUTO LAMP.
APPLICATION FILED OCT. 30, 1916.
1,217,664.
Patented Feb. 27, 1917.
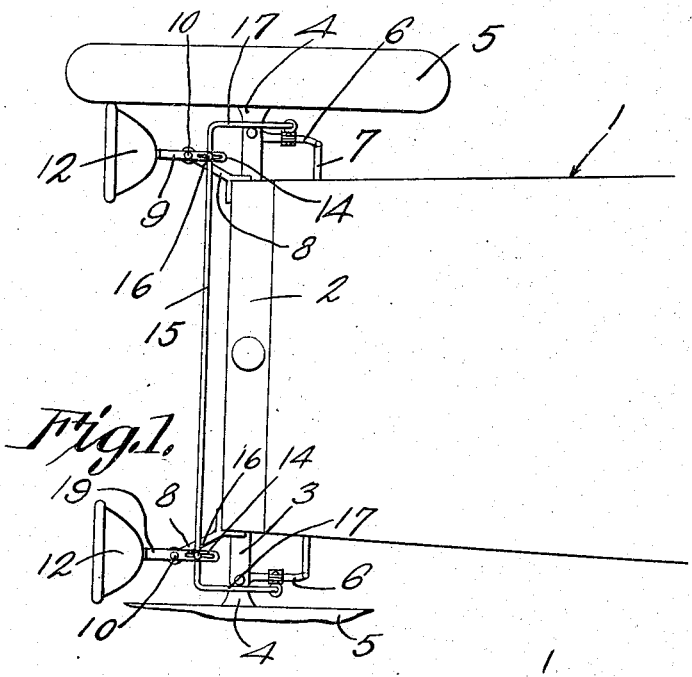
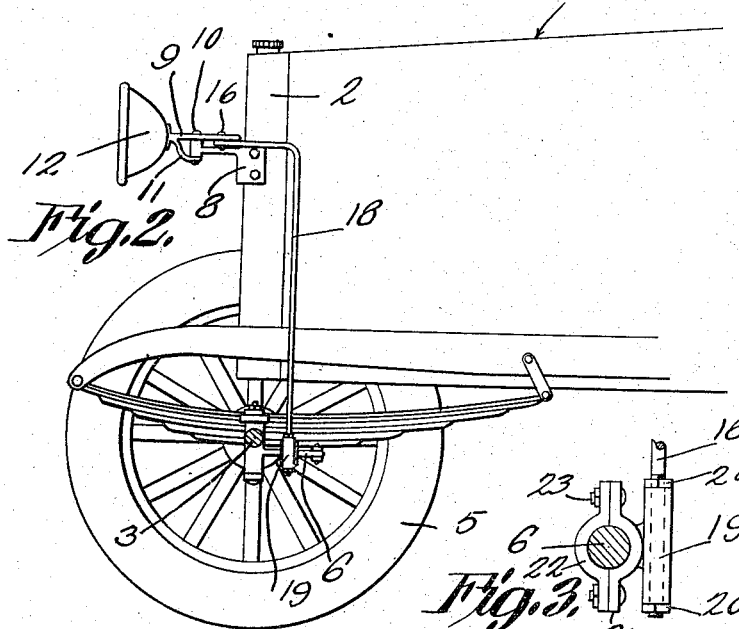
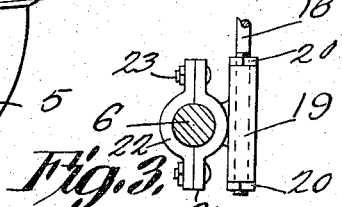
Witnesses
W. H. Thomas, Inventor
by C. A. Snow & Co., Attorneys

UNITED STATES PATENT OFFICE.

WAID H. THOMAS, OF HENSLER, NORTH DAKOTA.

AUTO-LAMP.

1,217,664.   Specification of Letters Patent.   Patented Feb. 27, 1917.

Application filed October 30, 1916. Serial No. 128,531.

*To all whom it may concern:*

Be it known that I, WAID H. THOMAS, a citizen of the United States, residing at Hensler, in the county of Oliver and State of North Dakota, have invented a new and useful Auto-Lamp, of which the following is a specification.

The object of this invention is to provide novel means whereby lamps on an automobile may be controlled from the movable axle ends which carry the front wheels of the vehicle.

It is within the province of the disclosure to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawings:—

Figure 1 shows in top plan, a portion of an automobile, whereunto the device forming the subject-matter of this application has been applied;

Fig. 2 is a side elevation of an automobile, showing the present invention applied thereto, parts appearing in section; and Fig. 3 is a fragmental transverse section showing the means whereby the rod which moves the lamps is connected with the movable axle ends.

In the accompanying drawing the numeral 1 indicates the hood of an automobile, the radiator of which appears at 2. The front axle of the vehicle is shown at 3 and carries the usual movable axle ends 4 on which the ground wheels 5 are journaled for rotation. The movable ends 4 have rearwardly projecting arms 6 connected by a steering rod 7. The construction above outlined is one which is common in automobiles, and need not be dwelt upon at greater length.

Brackets 8 are secured to the radiator 2 or elsewhere. Levers 9 are fulcrumed intermediate their ends as shown at 10 on the brackets 8. The levers 9 have underlying arms 11 connected with the fulcrum pins 10 of the levers 9. Mounted on the forward ends of the levers 9 are lamps 12. Adjacent their rear ends, and to the rear of the fulcra 10, the levers 9 are equipped with elongated slots 14.

The numeral 15 denotes a cross rod disposed in front of the radiator 2. The cross rod 15 has projections 16 movably received in the slots 14 of the lamp levers 9. The cross rod 15 includes rearwardly extended arms 17 terminating in depending fingers 18 journaled for rotation in sockets 19. Nuts 20 or the like are carried by the fingers 17 and engage, respectively, the upper and lower ends of the sockets 19, so as to uphold the rod 15. The sockets 19 constitute parts of clamp members 21 coacting with clamp members 22. Securing elements 23 unite the clamp members 21 and 22 and hold them on the arms 6 of the movable axle ends 4.

In practical operation, when the steering rod 7 is shifted longitudinally, to swing the wheels 5 through the instrumentality of the movable axle ends 4 and the arms 6, a longitudinal movement will be imparted to the cross rod 15, since the lower ends of the fingers 18 of the cross rod are mounted to rock or rotate in the sockets 19 of the clamp members 21 which are secured to the arms 6 of the movable axle ends. When the rod 15 is moved endwise, a swinging movement will be imparted to the levers 9, in a lateral direction, and consequently to the lamps 12, since the projections 16 on the cross rod 15 are slidably received in the slots 14 formed in the rear ends of the lamp levers 9.

The construction of the device is such that when the wheels 5 are shifted to alter the course of the vehicle, the lamps 12 will be turned in such a way as to light up the path which the vehicle is about to travel.

Having thus described the invention, what is claimed is:—

In a device of the class described, a motor vehicle including a body, an axle having movable ends provided with arms, and a steering rod connecting the arms; sockets mounted on the arms; brackets carried by the body and projecting forwardly therefrom; levers fulcrumed intermediate their ends on the brackets; lamps carried by the forward ends of the levers; a rod extended transversely of the body and located in front of the body, the rod having rearwardly projecting arms terminating in rigid depending fingers journaled in the sockets; and a lost motion connection between the rear ends of the levers and the rod.

In testimony that I claim the foregoing as my own, I have hereto affixed my signature in the presence of two witnesses.

WAID H. THOMAS.

Witnesses:
H. A. THOMAS,
H. A. THOMAS, Jr.